(12) United States Patent
Kumar R C

(10) Patent No.: US 11,327,956 B2
(45) Date of Patent: May 10, 2022

(54) CLOUD-BASED RENUMBERING OF IDENTIFIERS

(71) Applicant: SAP SE, Walldorf (DE)

(72) Inventor: Naveen Kumar R C, Bangalore (IN)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 16/688,580

(22) Filed: Nov. 19, 2019

(65) Prior Publication Data

US 2021/0103583 A1 Apr. 8, 2021

(30) Foreign Application Priority Data

Oct. 3, 2019 (IN) .............................. 201911039932

(51) Int. Cl.
| | |
|---|---|
| *G06F 16/23* | (2019.01) |
| *G06Q 30/00* | (2012.01) |
| *H04L 9/32* | (2006.01) |
| *G06F 16/22* | (2019.01) |

(52) U.S. Cl.
CPC ...... *G06F 16/2379* (2019.01); *G06F 16/2282* (2019.01); *G06Q 30/01* (2013.01); *H04L 9/3242* (2013.01)

(58) Field of Classification Search
CPC . G06F 16/2379; G06F 16/2282; G06Q 30/01; H04L 9/3242; H04L 2209/38; H04L 63/00; H04L 9/3239
See application file for complete search history.

(56) References Cited

U.S. PATENT DOCUMENTS 10,878,513 B1\* 12/2020 Sullivan ................. G06Q 40/12
2018/0270065 A1\* 9/2018 Brown ................... H04L 9/0643

OTHER PUBLICATIONS

Jan Goyvaerts and Steven Levithan Regular Expressions Cookbook, 2nd Edition Aug. pp. 1-12 (Year: 2012).\*
Nield, An Introduction to Regular Expressions, pp. 1-10, June (Year: 2019).\*
Ona, "The key to a successful implementation of S/4 HANA Cloud (1/3)", SAP Blog, Jul. 18, 2017, 18 pages.
Ona, "The key to a successful implementation of S/4 HANA Cloud (2/3)", SAP Blog, Sep. 14, 2017, 12 pages.
Ona, "The key to a successful implementation of S/4 HANA Cloud (3/3)", SAP Blog, Oct. 11, 2017, 9 pages.

\* cited by examiner

*Primary Examiner* — Albert M Phillips, III
(74) *Attorney, Agent, or Firm* — Klarquist Sparkman, LLP

(57) ABSTRACT

A computer-implemented method is disclosed. In a deployed cloud-based enterprise resource planning system that includes a general ledger account, the method can receive a change request specifying a new account identifier for the general ledger account, wherein the general ledger account is associated with an old account identifier. For a plurality of tables in the deployed enterprise resource planning system, the method can change the old account identifier to the new account identifier. In addition, for a reference framework interfacing with the plurality of tables, the method can change the old account identifier to the new account identifier in the reference framework.

19 Claims, 9 Drawing Sheets

CLOUD-BASED RENUMBERING OF IDENTIFIERS

BACKGROUND

Enterprise resource planning (ERP) is software that allows an organization to use a system of integrated applications to manage their business and automate many back-office functions related to technology, services and human resources. ERP software typically integrates day-to-day processes of an enterprise (for example, order-to-cash, procure-to-pay, plan-to-product, and request-to-service) and core capabilities in a single database, application and user interface. While on-premises ERP software is installed locally, typically on a company's own computers and servers, cloud ERP software is hosted on the vendor's servers and accessed through a web browser. Cloud ERP system technology has been adopted by more and more businesses because it generally has much lower upfront costs (because computing resources are leased by the companies rather than purchased outright and maintained on premises) and it also gives companies access to their business-critical applications at any time from any location.

However, existing cloud ERP systems have limited flexibility to reconfigure account settings after deployment. Thus, there remains a need for an improved cloud ERP system that allows users to reconfigure the system after it has been deployed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain embodiments of the disclosure concern a computer-implemented method. The method can include in a deployed cloud-based enterprise resource planning system comprising a general ledger account, receiving a change request specifying a new account identifier for the general ledger account. The general ledger account can be associated with an old account identifier. The method can further include for a plurality of tables in the deployed enterprise resource planning system, changing the old account identifier to the new account identifier. In addition, the method can include for a reference framework interfacing with the plurality of tables, changing the old account identifier to the new account identifier in the reference framework.

In some embodiments, changing the old account identifier to the new account identifier in the reference framework can include identifying a plurality of storage entities containing references to the general ledger account, searching for a predefined text pattern associated with the general ledger account in the identified plurality of storage entities, wherein the predefined text pattern is followed by the old account identifier, and for found predefined text pattern associated with the general ledger account, replacing the old account identifier with the new account identifier.

In some embodiments, changing the old account identifier to the new account identifier in the reference framework can further include maintaining a hashed key generated based on the identified plurality of storage entities that contain a keystring, wherein the keystring comprises the predefined text pattern and the old account identifier, and updating the hashed key after replacing the old account identifier with the new account identifier. The updated hashed key can be generated based on the identified plurality of storage entities that contain an updated keystring. The updated keystring can include the predefined text pattern and the new account identifier.

In some embodiments, the plurality of tables can be located in a cloud-based backend tenant of the deployed cloud-based enterprise resource planning system.

In some embodiments, the reference framework can be configured to modify the plurality of tables upon receiving an upgrade directive from a service provider. The upgrade directive can specify new features or functionalities to be implemented in the deployed cloud-based enterprise resource planning system.

In some embodiments, the reference framework can be located in the cloud-based backend tenant of the deployed cloud-based enterprise resource planning system.

In some embodiments, the reference framework can be located external to the cloud-based backend tenant of the deployed cloud-based enterprise resource planning system.

In some embodiments, changing the old account identifier to the new account identifier in the plurality of tables and the reference framework can be scheduled to occur in a period when there are no business transactions involving the general ledger account.

In some embodiments, the general ledger account can be one of a plurality of general ledger accounts in a chart of accounts. A plurality of old account identifiers can be respectively associated with the plurality of general ledger accounts. The change request can specify a plurality of new account identifiers corresponding to the plurality of general ledger accounts. The method can further include for the plurality of tables in the deployed enterprise resource planning system, changing the plurality of old account identifiers to the corresponding plurality of new account identifiers; and for the reference framework interfacing with the plurality of tables, changing the plurality of old account identifiers to the corresponding plurality of new account identifiers in the reference framework.

In some embodiments, changing the plurality of old account identifiers to the corresponding plurality of new account identifiers in the plurality of tables can include grouping the plurality of old account identifiers into a sequence of brackets such that each bracket comprises a pair of old account identifiers, and the plurality of old account identifiers in the sequence of brackets are arranged in an increasing order, replacing the plurality of old account identifiers in the sequence of brackets with the corresponding plurality of new account identifiers, and rearranging the sequence of brackets to generate a shuffled sequence of brackets such that the plurality of new account identifiers in the shuffled sequence of brackets are arranged in an increasing order.

Certain embodiments of the disclosure also concern a system that includes one or more processors and memory coupled to the one or more processors. The memory can include instructions that cause the one or more processors to perform the following when executed: in a deployed cloud-based enterprise resource planning system comprising a general ledger account, receiving a change request specifying a new account identifier for the general ledger account, wherein the general ledger account is associated with an old account identifier; for a plurality of tables in the deployed enterprise resource planning system, changing the old account identifier to the new account identifier; and for a reference framework interfacing with the plurality of tables, changing the old account identifier to the new account identifier in the reference framework.

Certain embodiments of the disclosure further concern one or more computer-readable media having encoded thereon computer-executable instructions that can cause one or more processors to perform a method. The method can include in a deployed cloud-based enterprise resource planning system comprising a plurality of general ledger accounts, receiving a change request specifying a plurality of new account identifiers corresponding to the plurality of general ledger accounts, wherein the plurality of general ledger accounts are associated with respective plurality of old account identifiers; for a plurality of tables in the deployed enterprise resource planning system, changing the respective plurality of old account identifiers to the corresponding plurality of new account identifiers; and for a reference framework interfacing with the plurality of tables, changing the respective plurality of old account identifiers to the corresponding plurality of new account identifiers in the reference framework. Changing the old account identifier to the new account identifier in the reference framework can include identifying a plurality of storage entities containing references to the general ledger account; searching for a predefined text pattern associated with the general ledger account in the identified plurality of storage entities, wherein the predefined text pattern is followed by the old account identifier; for found predefined text pattern associated with the general ledger account, replacing the old account identifier with the new account identifier; maintaining a hashed key generated based on the identified plurality of storage entities that contain a keystring, wherein the keystring comprises the predefined text pattern and the old account identifier; and updating the hashed key after replacing the old account identifier with the new account identifier, wherein the updated hashed key is generated based on the identified plurality of storage entities that contain an updated keystring. The updated keystring can include the predefined text pattern and the new account identifier.

The foregoing and other objects, features, and advantages will become more apparent from the following detailed description, which proceeds with reference to the accompanying figures.

DETAILED DESCRIPTION

EXAMPLE 1—OVERVIEW

Existing cloud ERP systems have limited flexibility to reconfigure account settings after deployment. For example, customers may want to change the identifiers of general ledger (G/L) accounts of a cloud ERP system after the ERP system has been deployed on the cloud. This could happen, for example, when a customer wants to change the naming convention of some G/L account identifiers after migrating from an on-premises ERP to a cloud ERP, or when there is a need to change the G/L account identifiers due to organizational change of the business (e.g., business acquisition or merger, etc.), or for other reasons. But if the cloud ERP system is already live (e.g., the customer is actively using the cloud ERP system) the customer may not be able to change the identifiers of G/L accounts due to system constraints.

Cloud ERP systems typically store data in many backend tables. Such data can be categorized as customizing data, master data, transactional data, and others. The number of backend tables can range from hundreds to millions, or more.

In typical ERP systems, the general ledger (G/L) works as a central repository for accounting data transferred from sub-ledgers or modules like accounts payable, accounts receivable, cash management, fixed assets, purchasing and projects. The G/L is the backbone of any accounting system that holds financial and non-financial data for an organization. The collection of accounts is known as the G/L. Each account is known as a G/L account. The G/L account identifiers are used in most of these transactions and can be present in many of these backend tables.

However, existing cloud ERP systems have limited flexibility to reconfigure account settings after deployment. For example, a service provider of a cloud ERP system typically has preconfigured business processes that are specific to its G/L accounting, or a predefined configuration for its G/L accounts and its usage. After the cloud ERP system goes live, such preconfigured business processes and predefined configurations are typically fixed in the backend systems. As such, a customer may not be able to change the basic building block of the ERP system, such as the G/L account identifiers, without compromising the integrity of backend tables and/or disrupting the system operations.

Thus, if the customer insists on changing the G/L account identifiers after the cloud ERP system is deployed, the customer may have to discard the historical transactional data that has been accumulated by the system and re-implement the cloud ERP solution afresh with new G/L account identifiers.

The described technologies herein can provide a system and method for changing G/L account identifiers after the cloud ERP system is deployed, thus offering considerable improvements over conventional cloud ERP systems.

EXAMPLE 2—EXAMPLE OVERALL SYSTEM OF CLOUD-BASED ERP SOLUTIONS

Figure 1:
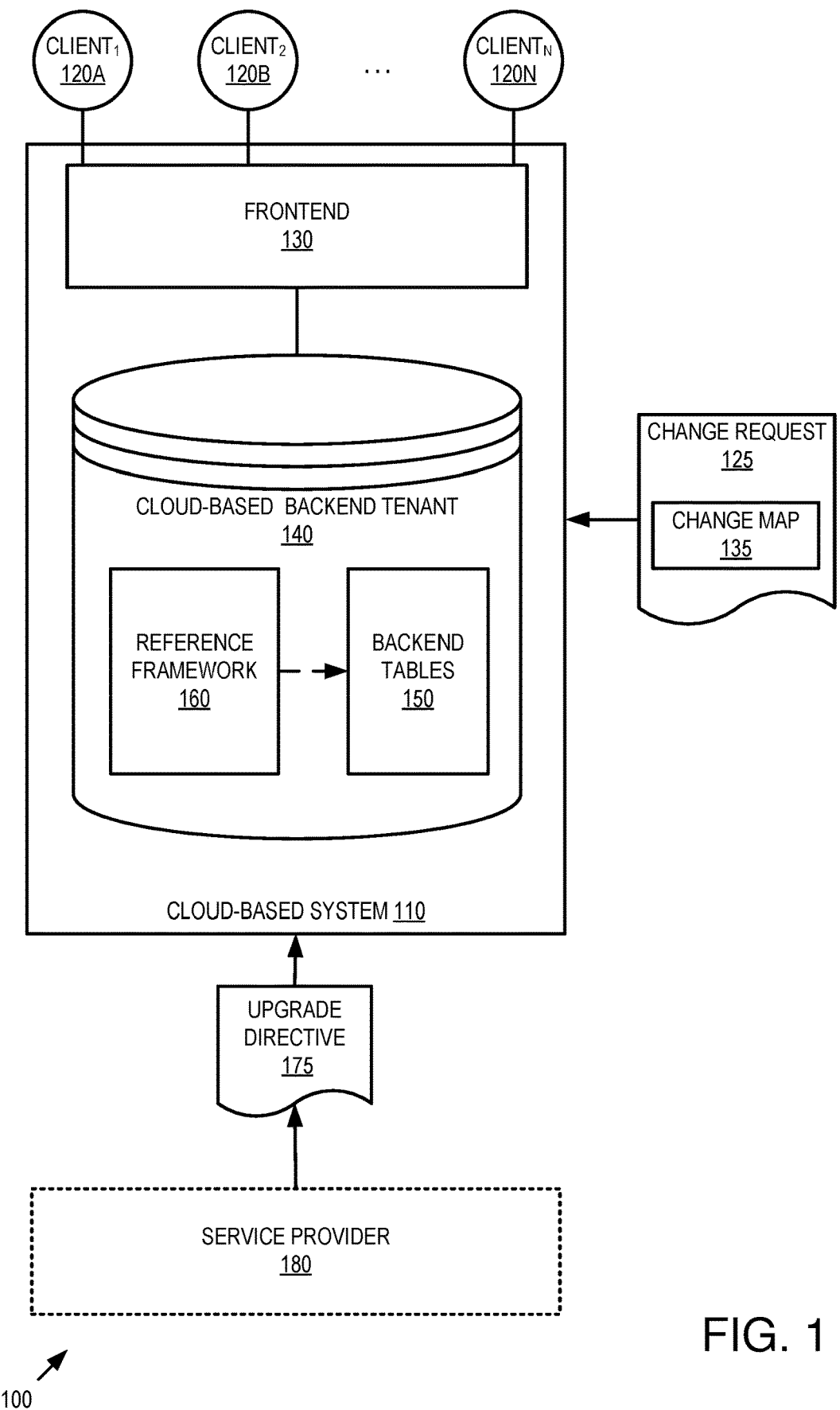
FIG. 1 is a block diagram of an example cloud ERP system implementing the described technologies.

FIG. 1 is a block diagram of an example overall system 100 implementing a cloud ERP system 110. In the example, the cloud ERP system 110 can comprise a frontend 130 and a cloud-based backend tenant system 140. Although a single tenant system 140 is shown, in practice, the cloud-based system 110 can implement systems for a plurality of tenants (e.g., different organizations) in a multi-tenant system that conduct their day-to-day operations via the cloud-based system 110.

In the depicted example, the cloud-based backend tenant system 140 (or simply "tenant") can comprise a plurality of backend tables 150 that store customer data and a reference framework 160 interfacing with the plurality of backend tables 150. For example, the reference framework 160 can be a software module embedded in the cloud-based backend tenant 140.

In an alternative embodiment, the reference framework 160 can be located external to the cloud-based backend tenant 140, but still interface with the backend tables 150. For example, the reference framework 160 can be a stand-alone software application that is configured to interface with the backend tables 150 located on the cloud-based backend tenant 140.

In any of the examples herein, a service provider 180 of the cloud ERP system 110 can send an upgrade directive 175 to the cloud ERP system 110. Such upgrade directive 175 can include instructions, which, when executed, can initiate a software upgrade to the ERP system 110, for example, by specifying new features, functionalities, bug fixes, or scope change to be implemented in the cloud-based backend tenant 140. Upon receiving the upgrade directive 175, the reference framework 160 can be updated to reflect newly specified business processes according to the instructions, and further configured to modify the backend tables 150.

In some cases, upgrades can apply to a plurality of tenant systems, but, due to customization of the systems, different systems may be upgraded slightly differently.

As described herein, any of the backend tables 150 can be configured to store customizing data, or master data, or transactional data, or any other types of data. The backend-tables 150 can contain a plurality of fields or attributes and a plurality of records corresponding to the plurality of fields or attributes. The plurality of backend tables 150 can relate to each other via the plurality of fields or attributes, and can be managed by a database engine (not shown) located on the cloud-based backend tenant 140.

As described herein, the cloud ERP system 110 can maintain a general ledger which can include a plurality of G/L accounts, as described further below. Each of the G/L accounts can be associated with a G/L account identifier. The G/L account identifiers can be present in one or more of these backend tables 150. In addition, the G/L account identifiers can be present in the reference framework 160.

One or more client machines (e.g., operated by customers of the service provider 180 or another party) 120A-N can interact with the cloud ERP system 110 through the frontend 130. For example, after the cloud ERP system 110 is deployed, any of the clients 120A-N can enter data into or access data from the backend tables 150 located on the cloud-based backend tenant 140 by interacting with the frontend 130. In other words, the cloud ERP system 110 can support multiple clients simultaneously exchanging information with the backend tables 150. In a multi-tenant system, the multiple clients can be operated by multiple parties or organizations.

As depicted in FIG. 1, a change request 125 can be sent to the cloud ERP system 110. For example, the change request 125 can be sent by any of the clients 120A-N or some other source. In some embodiments, the change request 125 can request a change of one or more G/L account identifiers in the cloud ERP system 100. In some embodiments, the change request 125 can include a change map 135 that specifies one or more pairs of old G/L account identifiers and the corresponding new G/L account identifiers. Upon receiving the change request 125, the cloud ERP system 110 can initiate a change of the specified G/L account identifiers in the backend tables 150, as well as in the reference framework 160, as described more fully below. As a result, the old G/L account identifiers in the backend tables 150 and the reference framework 160 can be replaced with the corresponding new G/L account identifiers.

In practice, the systems shown herein, such as the cloud ERP system 110, can vary in complexity, with additional functionality, more complex components, and the like. For example, there can be additional functionality within the cloud-based backend tenant 140. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The cloud ERP system 110 and any of the other systems described herein can be implemented in conjunction with any of the hardware components described herein, such as the computing systems described below (e.g., processing units, memory, and the like). In any of the examples herein, computer-executable instructions for implementing the methods described herein, tables, change map, the input, output and intermediate data of running the cloud ERP system 110, and the like can be stored in one or more computer-readable storage media or computer-readable storage devices. The technologies described herein can be generic to the specifics of operating systems or hardware and can be applied in any variety of environments to take advantage of the described features.

EXAMPLE 3—EXAMPLE G/L ACCOUNTS AND CHANGE OF G/L ACCOUNT IDENTIFIERS

As noted above, a general ledger (G/L) can include a set of G/L accounts that a business can use to keep track of its financial transactions and to prepare financial reports. Each G/L account can be a unique record summarizing each type of asset, liability, equity, revenue and expense.

A chart of accounts is a structure containing the G/L accounts used by one or more company codes, wherein the company code is the smallest organizational unit of financial accounting for which one can draw individual Financial Statements like Balance Sheet and Profit & Loss Account for purpose of external reporting. The chart of accounts can list all of the G/L accounts in the G/L, which can number in the thousands or more for a large business.

Figure 2:
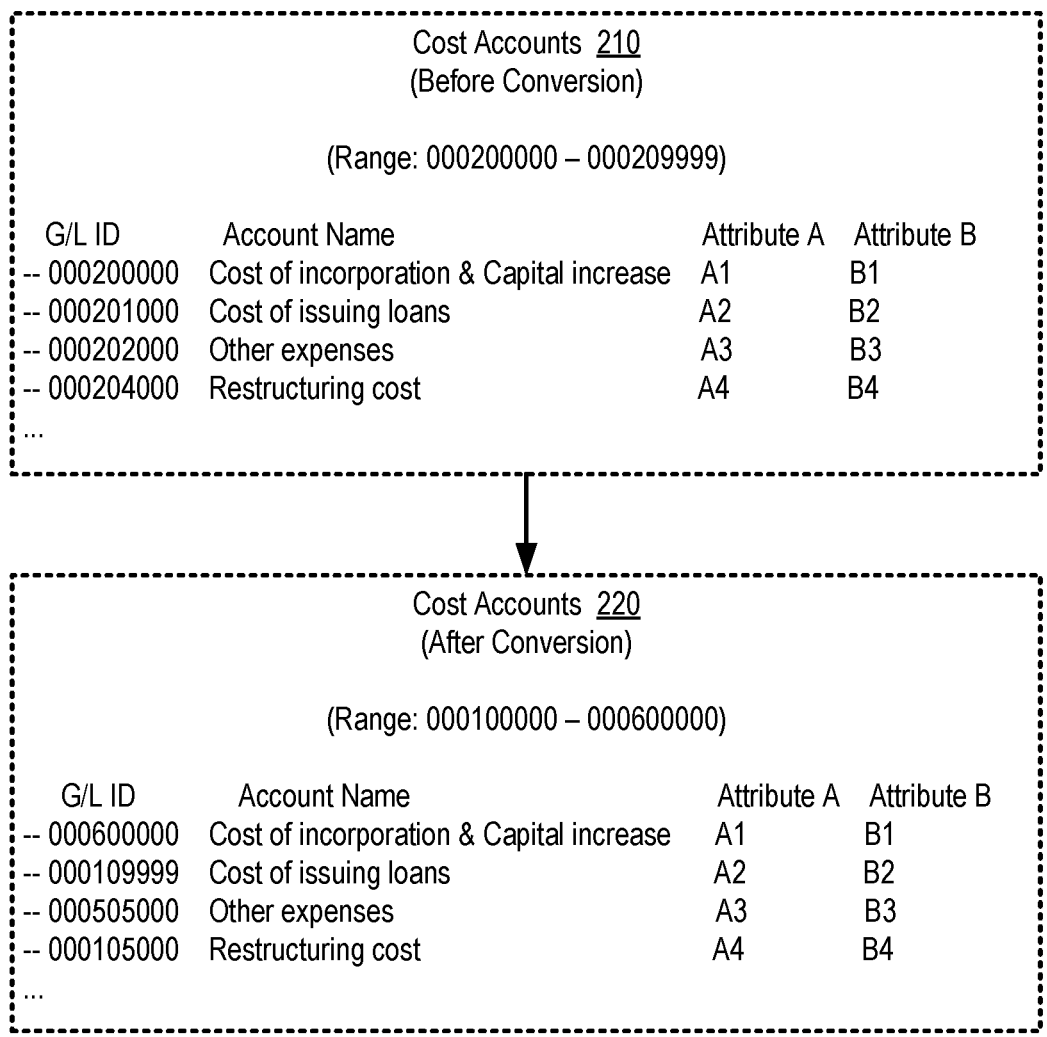
FIG. 2 is a diagram illustrating changes of G/L account identifiers in a cloud ERP system.

As noted above, the G/L account identifiers in a chart of accounts can be changed even after the cloud ERP system 110 is deployed. As one example, FIG. 2 illustrates changing the G/L account identifiers for a chart of accounts named "Cost Accounts," which contains at least four G/L accounts, namely: (1) Cost of incorporation & capital increases, (2) Cost of issuing loans, (3) Other expenses, and (4) Restructuring cost.

After the initial deployment of the cloud ERP system 110, the Cost Accounts 210 has a predefined range from 00020000 to 000209999 for all possible G/L account identifiers. For example, the old G/L account identifiers for the above four G/L accounts are 000200000, 000201000, 000202000, and 000204000, respectively. After receiving the change request 125, the identifiers of the above four G/L accounts are converted to 000600000, 000109999, 000505000, and 000105000, respectively. The Cost Accounts 220 can also be updated with a new range, e.g., from 000100000 to 000600000.

Each G/L account can be associated with one or more attributes. Two attributes (Attributes A and B) are shown in FIG. 2 as examples. As shown, except for the change of G/L account identifiers, the G/L account remains the same with respect to its account name and associated attributes. In other words, all the transaction data previously recorded by the G/L account are preserved.

EXAMPLE 4—EXAMPLE OVERALL OPERATIONAL METHOD OF CLOUD-BASED RENUMBERING GENERAL LEDGER ACCOUNT IDENTIFIERS

Figure 3:
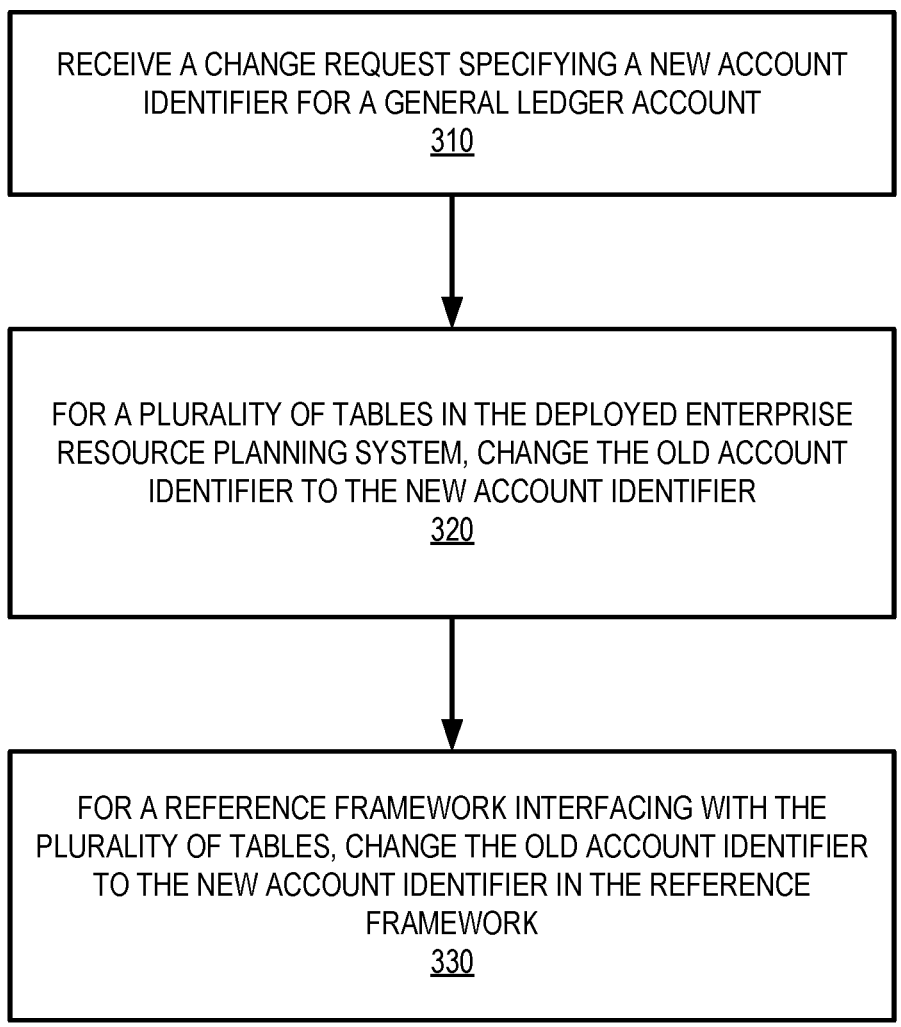
FIG. 3 is a flowchart illustrating an example overall method of changing G/L account identifiers in a cloud ERP system.

FIG. 3 is a flowchart depicting an example overall operational method 300 of changing G/L account identifiers in a deployed cloud ERP system that can be used in any of the examples herein. The method 300 can be performed, for example, by the system described in FIG. 1.

In this example, the deployed cloud ERP system 110 can receive a change request 125 at 310. The change request 125 can specify a new account identifier for a G/L account, which is associated with an old account identifier. At 320, for a plurality of backend tables 150 in the cloud ERP system 110, the old account identifier associated with the G/L account is replaced with the new account identifier. Then, at 330, for the reference framework 160 interfacing with the plurality of backend tables 150, the old account identifier associated with the G/L account is also replaced with the new account identifier.

Although the method 300 describes replacing the identifier of one G/L account, the method 300 can be applied to replace the identifiers of a plurality of G/L accounts. For example, the change request 125 can specify a plurality of new account identifiers corresponding to the plurality of G/L accounts, wherein the plurality of G/L accounts are associated with respective plurality of old account identifiers. Thus, the respective plurality of old account identifiers can be changed to the corresponding plurality of new account identifiers in the plurality of backend tables 150 as well as in the reference framework 160.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

EXAMPLE 5—EXAMPLE METHOD OF CHANGING GENERAL LEDGER ACCOUNT IDENTIFIERS IN BACK-END TABLES

In one embodiment, the cloud ERP system 110 can maintain a database schema which defines the structures of the backend tables 150, and such schema can contain the names of all backend tables 150 and all field names contained in those backend tables 150. By searching the schema, the list of backend tables 150 and fields where the G/L account identifiers need to be changed can be identified.

In one exemplary embodiment, the cloud ERP system can be configured to allow a user to create a domain for technical definition of a table field such as the field type and length. For example, the user can use a domain to define the length (e.g., 10) and data type (e.g., character) of a G/L account. The domain can then be assigned to the data element, which in turn can be assigned to the table fields. For example, assuming the domain SAKNR refers to a G/L account (with length=10 and data type=character), then any table field whose domain is SAKNR contains the G/L account. The cloud ERP system can maintain a repository that contains the complete list of tables and respective fields with assigned domain information. Thus, by searching for domain SAKNR in this repository, a list of tables and the corresponding table fields containing the G/L account can be obtained.

In some embodiments, to make the changes consistently across the backend tables 150 that might possibly contain the G/L account identifiers, a parallel conversion process can be applied. For example, the method 300 can generate or instantiate a plurality of programs that are directed to replace the G/L account identifiers in one of the identified backend tables 150. The plurality of programs can be run in parallel so that multiple tables can be processed simultaneously.

It is noted, however, that merely changing the G/L account identifiers in the backend tables, without more, can distort the range of the resulting G/L account identifiers. For example, as shown in FIG. 2, the old account identifiers for the four old G/L accounts has a range from a lower number 000200000 to a higher number 0000206000. Merely replacing the old account identifiers with the new account identifiers would distort the range since it cannot begin with a higher number 000600000 and end with a lower number 000109999. Thus, to make the range of the new account identifiers meaningful, the sequence of the G/L accounts can be rearranged.

Figure 4:
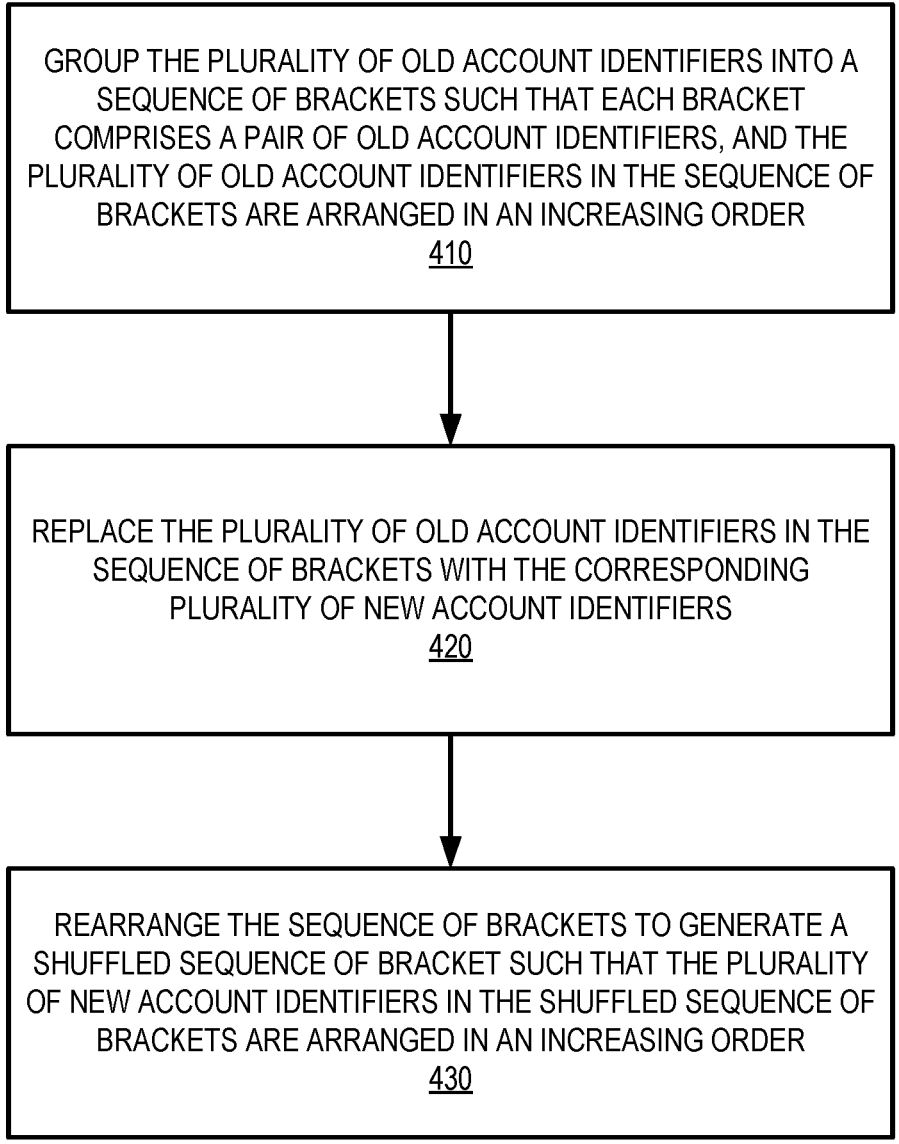
FIG. 4 is a flowchart illustrating an example method of G/L account identifiers in a plurality of tables.

FIG. 4 is a flowchart illustrating an example method 400 of changing the G/L account identifiers in the back-end tables 150.

At 410, the method 400 can group the plurality of old account identifiers into a sequence of brackets such that each bracket comprises a pair of old account identifiers, and the plurality of old account identifiers in the sequence of brackets are arranged in an increasing order.

Using the example shown in FIG. 3, according to 410, the four old account identifiers can be grouped into the following two brackets:

Bracket 1: [000200000-000201000]
Bracket 2: [000202000-000204000]

Each bracket defines an interval with two endpoints: a left-end point (000200000 in Bracket 1 and 000202000 in Bracket 2) and a right-end point (000201000 in Bracket 1 and 000204000 in Bracket 2). In this example, within each bracket, the right-end point is larger than the left-end point. In addition, the right-end point of one bracket (e.g., 000201000 in Bracket 1) is constrained to be smaller than the left-end point of the following bracket (e.g., 000202000 in Bracket 2). If there are an odd number of old account identifiers, the largest old account identifier (e.g., 000209000) can be repeated once so that it can be defined as both the left-end and right-end points of the last bracket (e.g., [000209000-000209000]).

At 420, the method 400 can replace the plurality of old account identifiers in the sequence of brackets with the corresponding plurality of new account identifiers. Following the above example, after replacing the old account identifiers with new account identifiers as shown in FIG. 2, the brackets become:

Bracket 1: [000600000-000505000]
Bracket 2: [000105000-000109999]

At 420, the method 400 can rearrange the sequence of brackets (e.g., by using a sorting algorithm) to generate a shuffled sequence of brackets such that the plurality of new account identifiers in the shuffled sequence of brackets are arranged in an increasing order. Still following the above example, the left-end point and right-end point in Bracket 1 will be switched (since 000505000 is smaller than 000600000), and Bracket 2 will be switched with Bracket 1 (since 000109999 is smaller than 000505000). Thus, the rearranged sequence of brackets become:

Bracket 1: [000105000-000109999]
Bracket 2: [000505000-000600000]

Thus, after changing the G/L account identifiers in the back-end tables 150, the new account identifiers can have a meaningful range from 000105000 to 000600000.

EXAMPLE 6—EXAMPLE METHOD OF CHANGING GENERAL LEDGER ACCOUNT IDENTIFIERS IN REFERENCE FRAMEWORK

After the cloud ERP system 110 is activated based on a client's initial requirements, a large amount of data will be generated that will be subject to manipulation by future feature upgrades, bug fixes, or scope change to be introduced by the service provider 180.

Even after making consistent changes across all the backend tables 150 that contain the G/L account identifiers, additional changes are performed on the reference framework 160 that interfaces with the backend tables 150. This is because the reference framework 160, which was initially activated by the service provider 180, contains runtime data that still refers to the old G/L account identifiers. Thus, if no change is made to the reference framework 160, the reference framework 160 will not be able to correctly interact with the renumbered G/L accounts. Accordingly, the service provider 180 will no longer be able to consistently deliver feature upgrades, bug fixes, or scope change to the cloud ERP system 110.

Figure 5:
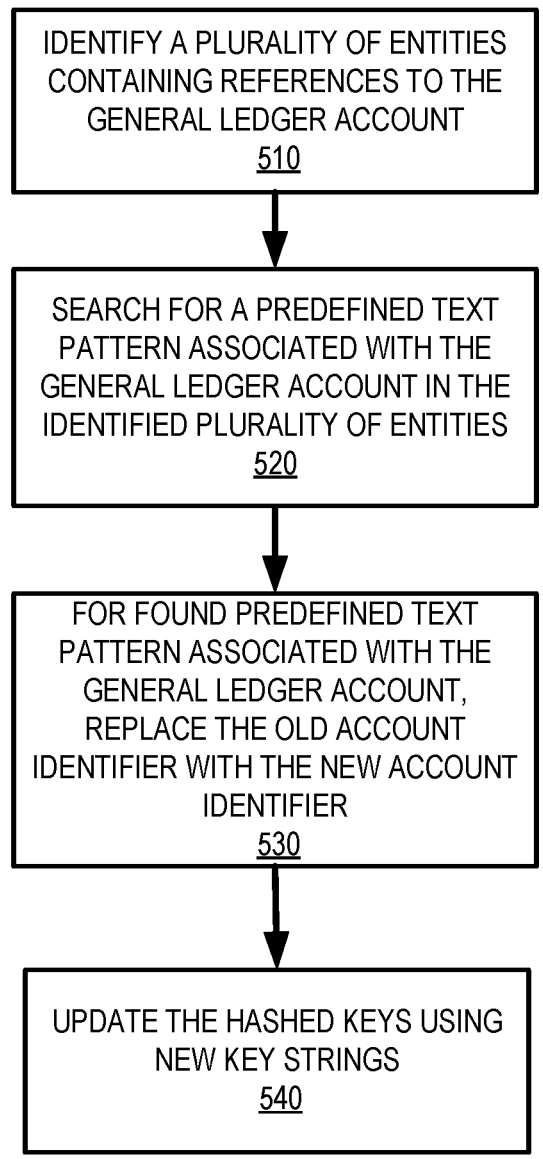
FIG. 5 is a flowchart illustrating an example method of changing G/L account identifiers in a reference framework.

FIG. 5 is a flowchart 500 of an example method of changing G/L account identifiers in the reference framework 160.

At 510, the method identifies a plurality of storage entities containing references to the general ledger account. Such references can be embodied in keystrings. As described herein, the storage entities can comprise any files or other storage artifacts that are present in the reference framework 160.

As described herein, the keystring can be represented as a string of characters that contains a list of parameter name, parameter value pairs. For example, § I_KTOPL=YCOA§ I_SAKNR=0022006071 can be a keystring that contains the following information: I_KTOPL is the parameter name for a chart of account, YCOA is the chart of account, I_SAKNR is the parameter name for a G/L account, and 0022006071 is the G/L account. Thus, this keystring refers to a specific G/L account in a chart of account (YCOA, 0022006071). If the service provider wants to change an attribute of the G/L account 0022006071 in chart of account YCOA, then the service provider can identify this G/L account by searching for the parameter name I_SAKNR in this keystring, and further identify in which tables this attribute needs to be changed.

At 520, the method searches for a predefined text pattern (e.g., the parameter name I_SAKNR) associated with the general ledger account in the identified plurality of storage entities. Such text pattern comprises a reference to the general ledger account and can appear in keystrings. Within the storage entity, the predefined text pattern can be followed by the old account identifier; the two can be joined by a linking string such as "=" or the like. Searching can proceed by searching strings for occurrences of the predefined text pattern, searching strings for occurrences of the old account identifier, or searching strings for occurrences of a combination of the predefined text pattern in combination with the old account identifier (e.g., joined with a linking string such as "=" or the like).

At 530, for each found predefined text pattern associated with the general ledger account, the method can replace the old account identifier with the new account identifier within the reference (e.g., keystring).

As a result of the change, hashes of the keystrings will no longer be valid. At 540, the hash keys of the keystrings are updated as described in the following section.

For example, the storage entities can include a chart of account file which defines a plurality of G/L accounts, each of which has a unique G/L account identifier. The chart of account file can have a unique filename or storage entity name. In addition, the storage entities can include other files (e.g., financial statement versions) which use (e.g., read from or write to) the G/L accounts. Each of those files can also have a unique filename or storage entity name.

Figure 6:
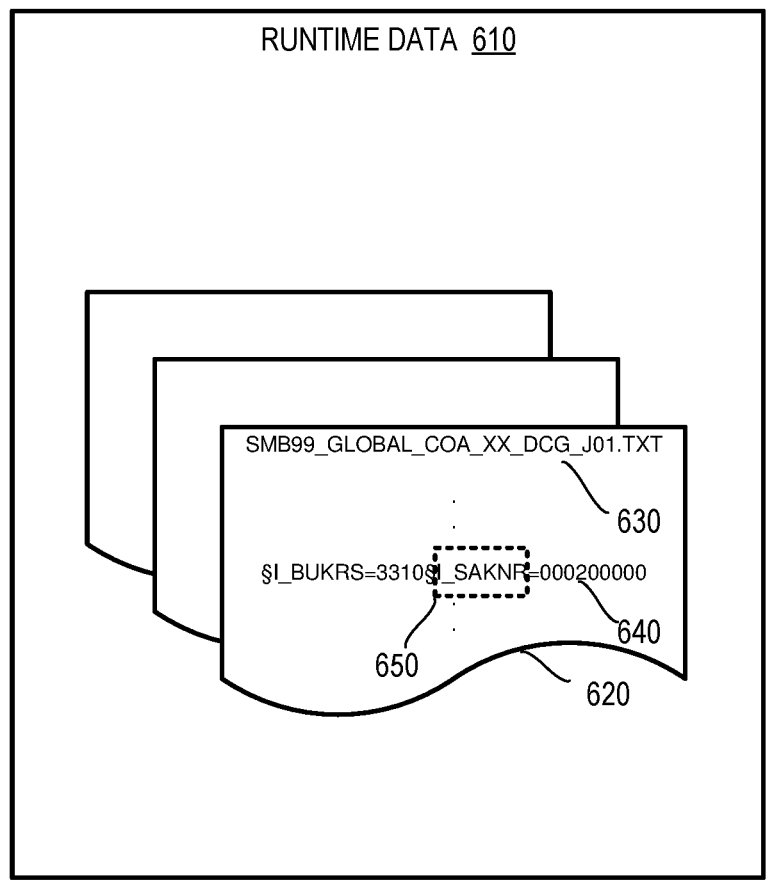
FIG. 6 is a diagram illustrating relationships between a reference framework, entities, and keystrings containing G/L account identifiers.

FIG. 6 schematically illustrates the runtime data 610 of a reference framework that contains a plurality of storage entities 620 using the G/L accounts. A storage entity can have a unique filename or storage entity name 630. In addition, the storage entities 620 can include a plurality of keystrings 640. After identifying the possible storage entities 620 that use the G/L account identifiers, then the method can identify the G/L accounts located in the storage entities 620 based on a predefined parameter 650 that represents G/L account identifiers.

For example, FIG. 6 shows that one of the storage entities has a filename "SMB99_GLOBAL_COA_XX_DCG_J01.TXT." That storage entity contains a keystring "§ I_BUKRS=3310§I_SAKNR=000200000." Here, the text string "I_BUKRS" is an identifier/parameter name for the Company. "3310" is the Company's identifier (e.g., an identifier that uniquely identifies the company). The text string "I_SAKNR" is a predefined parameter name (e.g., predefined text pattern) indicating G/L accounts. As shown, that parameter is followed by a G/L account identifier "000200000." Thus, by searching for the text pattern of the parameter name "I_SAKNR" in the keystrings of the found storage entities, the old G/L account identifiers (which follows the parameter name "I_SAKNR") used by the reference framework 160 can be located and replaced with corresponding new G/L account identifiers within the keystrings.

EXAMPLE 7—EXAMPLE HASHED KEYS

Figure 7:
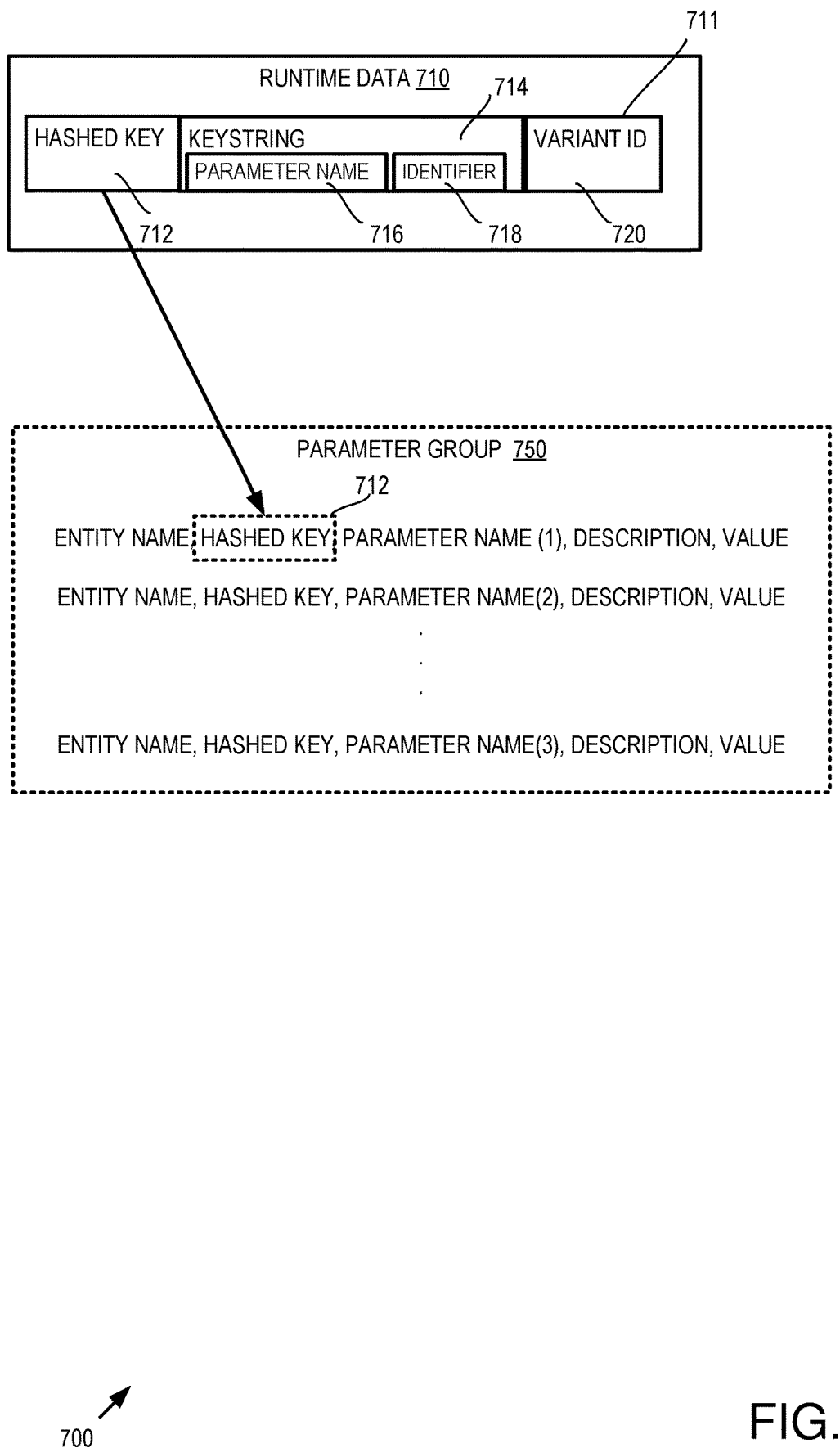
FIG. 7 is a diagram illustrating a relationship between hashed keys and parameter groups.

As illustrated in FIG. 7, the reference framework can maintain runtime data 710, that contains a plurality of entries 711. An entry 711 can contain a keystring 714 that contains one or more parameter names 716, identifier 718 (parameter value) pairs and a variant id 720. An entry can contain a hashed key 712 (e.g., calculated on the keystring 714) that points into a parameter group 750 that contains other parameters (e.g., parameter name/parameter value pairs) related to the parameters 716/718 of the entry 711.

The parameter group 750 contain entries with an entity name, hashed key, parameter name, description, and value for the parameters in the group. For example, a company parameter name and company identifier in a keystring can yield a hash value that correlates with a parameter group that has a number of parameter name/parameter value pairs (e.g., particular to the company). During updates to the software, such parameters can be found and read or modified via the hashed key.

A query using the hashed key against a set of possible parameters (including the parameter group 750 and other, unrelated parameters) can yield the parameter group 750. Using a hash of the keystring can speed up the process as compared to trying to query using the keystring.

However, if the account number identifiers are changed, the hashed keys are no longer valid (e.g., because the identifier value has changed). Therefore, they can be updated as described herein.

For illustration purposes, the table below shows one example hashed key 003237A0235162407B69B5D-84D77A6BC59CFA44A, which is generated from the keystring § I_BUKRS=1510§ I_SAKNR=0021300200.

| | |
|---|---|
| Client | 715 |
| Solution ID | Z_CUST_JP |
| File name | FS01_SKB1_J16_JP.TXT |
| Hashed key | 003237A0235162407B69B5D84D77A6BC59CFA44A |
| Char255 | §I_BUKRS=1510§I_SAKNR=0021300200 |
| Variant | t0QGOCRbydvRjfP0zBHre4phWJc= |
| Creation Time Stamp | 2, 01, 90, 52, 71, 54, 122 |

Here, the keystring contains the following information: I_BUKRS is the parameter name which refers to a company, 1510 is the company's ID (e.g., the company is "1510"), I_SAKNR is the parameter name for a G/L account, and 0022006071 is the G/L account (e.g., the G/L account is "0022006071"). Thus, in this example, the hashed key refers to the keystring containing the G/L account 0022006071, which is posted to the company 1510.

In some embodiments, the G/L account can have multiple attributes. For example, the table below lists 37 attributes (each attribute has one corresponding file) associated with the G/L account 0022006071 within the company 1510. As shown, the 37 attributes are saved respective files, but they all share the same hashed key (e.g., they are in a parameter group as described herein).

| File name | Hashed key | Parameter | Description | Value |
|---|---|---|---|---|
| FS01_SKB1_J16_JP.TXT | 003237A0235162407B69B5D84D77A6BC59CFA44A | I_ALTKT | Alternative Account Number in Company Co | 0041231000 |
| FS01_SKB1_J16_JP.TXT | 003237A0235162407B69B5D84D77A6BC59CFA44A | I_BEGRU | Authorization Group | |
| FS01_SKB1_J16_JP.TXT | 003237A0235162407B69B5D84D77A6BC59CFA44A | I_BEWGP | Valuation Group | |
| FS01_SKB1_J16_JP.TXT | 003237A0235162407B69B5D84D77A6BC59CFA44A | I_BUKRS | Company Code | 1510 |
| FS01_SKB1_J16_JP.TXT | 003237A0235162407B69B5D84D77A6BC59CFA44A | I_BUSAB | Accounting clerk | |
| FS01_SKB1_J16_JP.TXT | 003237A0235162407B69B5D84D77A6BC59CFA44A | I_ERDAT | Date on which the Record Was Created | |
| FS01_SKB1_J16_JP.TXT | 003237A0235162407B69B5D84D77A6BC59CFA44A | I_ERNAM | Name of Person who Created the Object | SAP |
| FS01_SKB1_J16_JP.TXT | 003237A0235162407B69B5D84D77A6BC59CFA44A | I_FDGRV | Planning group | |
| FS01_SKB1_J16_JP.TXT | 003237A0235162407B69B5D84D77A6BC59CFA44A | I_FDLEV | Planning Level | |
| FS01_SKB1_J16_JP.TXT | 003237A0235162407B69B5D84D77A6BC59CFA44A | I_FIPLS | Financial Budget Item | 000 |
| FS01_SKB1_J16_JP.TXT | 003237A0235162407B69B5D84D77A6BC59CFA44A | I_FIPOS | Commitment Item | |
| FS01_SKB1_J16_JP.TXT | 003237A0235162407B69B5D84D77A6BC59CFA44A | I_FSTAG | Field status group | YB01 |
| FS01_SKB1_J16_JP.TXT | 003237A0235162407B69B5D84D77A6BC59CFA44A | I_HBKID | Short Key for a House Bank | |
| FS01_SKB1_J16_JP.TXT | 003237A0235162407B69B5D84D77A6BC59CFA44A | I_HKTID | ID for Account Details | |
| FS01_SKB1_J16_JP.TXT | 003237A0235162407B69B5D84D77A6BC59CFA44A | I_INFKY | Inflation Key | |
| FS01_SKB1_J16_JP.TXT | 003237A0235162407B69B5D84D77A6BC59CFA44A | I_KDFSL | Key for Exchange Rate Differences in For | |
| FS01_SKB1_J16_JP.TXT | 003237A0235162407B69B5D84D77A6BC59CFA44A | I_MCAKEY | MCA Key | |
| FS01_SKB1_J16_JP.TXT | 003237A0235162407B69B5D84D77A6BC59CFA44A | I_MITKZ | Account is reconciliation account | |
| FS01_SKB1_J16_JP.TXT | 003237A0235162407B69B5D84D77A6BC59CFA44A | I_MWSKZ | Tax Category in Account Master Record | |
| FS01_SKB1_J16_JP.TXT | 003237A0235162407B69B5D84D77A6BC59CFA44A | I_RECID | Recovery Indicator | |
| FS01_SKB1_J16_JP.TXT | 003237A0235162407B69B5D84D77A6BC59CFA44A | I_SAKNR | G/L Account Number | 0021300200 |
| FS01_SKB1_J16_JP.TXT | 003237A0235162407B69B5D84D77A6BC59CFA44A | I_TOGRU | Tolerance Group for G/L Accounts | |

-continued

| File name | Hashed key | Parameter | Description | Value |
|---|---|---|---|---|
| FS01_SKB1_J16_JP.TXT | 003237A0235162407B69B5D84D77A6BC59CFA44A | I_VZSKZ | Interest calculation indicator | |
| FS01_SKB1_J16_JP.TXT | 003237A0235162407B69B5D84D77A6BC59CFA44A | I_WAERS | Account currency | JPY |
| FS01_SKB1_J16_JP.TXT | 003237A0235162407B69B5D84D77A6BC59CFA44A | I_XGKON | Cash receipt account/cash disbursement | |
| FS01_SKB1_J16_JP.TXT | 003237A0235162407B69B5D84D77A6BC59CFA44A | I_XINTB | Indicator: Is account only posted to aut | |
| FS01_SKB1_J16_JP.TXT | 003237A0235162407B69B5D84D77A6BC59CFA44A | I_XKRES | Indicator: Can Line Items Be Displayed b | X |
| FS01_SKB1_J16_JP.TXT | 003237A0235162407B69B5D84D77A6BC59CFA44A | I_XLGCLR | Clearing Specific to Ledger Groups | |
| FS01_SKB1_J16_JP.TXT | 003237A0235162407B69B5D84D77A6BC59CFA44A | I_XLOEB | Indicator: Account marked for deletion? | |
| FS01_SKB1_J16_JP.TXT | 003237A0235162407B69B5D84D77A6BC59CFA44A | I_XMITK | Indicator: Reconcil.acct ready for input | |
| FS01_SKB1_J16_JP.TXT | 003237A0235162407B69B5D84D77A6BC59CFA44A | I_XMWNO | Indicator: Tax code is not a required fi | |
| FS01_SKB1_J16_JP.TXT | 003237A0235162407B69B5D84D77A6BC59CFA44A | I_XNKON | Indicator: Supplement for automatic post | |
| FS01_SKB1_J16_JP.TXT | 003237A0235162407B69B5D84D77A6BC59CFA44A | I_XOPVW | Indicator: Open Item Management? | |
| FS01_SKB1_J16_JP.TXT | 003237A0235162407B69B5D84D77A6BC59CFA44A | I_XSALH | Indicator: Only Manage Balances in Local | |
| FS01_SKB1_J16_JP.TXT | 003237A0235162407B69B5D84D77A6BC59CFA44A | I_XSPEB | Indicator: Is Account Blocked for Postin | |
| FS01_SKB1_J16_JP.TXT | 003237A0235162407B69B5D84D77A6BC59CFA44A | I_ZINRT | Interest calculation frequency in months | 00 |
| FS01_SKB1_J16_JP.TXT | 003237A0235162407B69B5D84D77A6BC59CFA44A | I_ZUAWA | Key for sorting according to assignment | 001 |

The hashed key can link between the corresponding keystring and all attributes of such keystring. Thus, when there is a need to change one attribute of a specific G/L account, the hashed key can help navigate from the keystring to the list of attributes.

In some embodiments, after each replacement of an old G/L account identifier with a new G/L account identifier, the corresponding hashed key must be updated so that it can continue to index the correct G/L account.

As described above, the runtime data 710 contained in the reference framework can include a plurality of storage entities that use the G/L accounts, and each of those storage entities contains at least a keystring 714 that includes the predefined parameter name 716 and the G/L account identifier 718. For each such key string 714, a corresponding hashed key 712 can be generated by using a hash function. Any number of suitable hash algorithms can be used, and hash collisions can be addressed accordingly. The hash algorithm can be applied to generate the hashed key from the keystring.

Because the keystring 714 is altered after changing the G/L account identifier 718, the corresponding hashed key 712 must be regenerated after replacing the old G/L account identifiers with the new G/L account identifiers in the keystring 714. Such update of the hashed key thus ensures that it continues to map to the correct G/L account despite the change of the G/L account identifier in the reference framework.

For illustration purposes, the two tables below respectively show selected runtime data before and after changing four G/L account identifiers, following the examples shown in FIG. 3. In these tables, the keystrings contain the predefined parameter name "I_SAKNR" followed by a G/L account identifier. Each keystring is indexed by a generated hashed key. In addition, each G/L account is also identified by a variant ID, which is machine generated and uniquely linked to the corresponding G/L account (i.e., even if the G/L account identifier is renumbered, the variant ID remains the same such that it always points to the same G/L account).

| Runtime Data Before Changing G/L Account IDs | | |
|---|---|---|
| HASHED KEY | Parameter | KeyString |
| 352423C4323AA7BC69A17AB2C1AA451F3C9135CF | I_SAKNR | §I_BUKRS=3310§I_SAKNR=000200000 |
| AB2BD2C3C7F28F4D667EEA5323B6E145DDA7B56B | I_SAKNR | §I_BUKRS=3310§I_SAKNR=000201000 |
| 9495141D517F676E6DFCE4F1D09C569E485EF2BF | I_SAKNR | §I_BUKRS=3310§I_SAKNR=000202000 |
| 5173A557C2FFB82C85907DE7ABD6C83245B4FD76 | I_SAKNR | §I_BUKRS=3310§I_SAKNR=000204000 |
| HASHED KEY | | Variant ID |
| 352423C4323AA7BC69A17AB2C1AA451F3C9135CF | | +5vQeNxMQhe9K6HaTp3pqiCXuW0= |
| AB2BD2C3C7F28F4D667EEA5323B6E145DDA7B56B | | +E/VUjI6wUEGwqAqUPTmCQkY2Gc= |
| 9495141D517F676E6DFCE4F1D09C569E485EF2BF | | +HaEiOkL3mUe58uQ1eaCon3XO/o= |
| 5173A557C2FFB82C85907DE7ABD6C83245B4FD76 | | +I2fEK0VBGIuaFIRaVnf7CIYx+U= |

| Runtime Data After Changing G/L Account IDs | | |
|---|---|---|
| HASHED KEY | Parameter | KeyString |
| 34B1E55C1C0E8E55D4F848E8B400430E3FDC38D8 | I_SAKNR | §I_BUKRS=3310§I_SAKNR=000600000 |
| 56D2AFC560D495C758C798B4278E4FAF5CA76649 | I_SAKNR | §I_BUKRS=3310§I_SAKNR=000109999 |
| BBA7CF6BBB5E6D5FCE518D02C50970B5A5F8312F | I_SAKNR | §I_BUKRS=3310§I_SAKNR=000505000 |
| 7F6F91F7BFBC7E0E92B9E1FF8D16FC0CE117A4C8 | I_SAKNR | §I_BUKRS=3310§I_SAKNR=000105000 |

| HASHED KEY | Variant ID |
|---|---|
| 34B1E55C1C0E8E55D4F848E8B400430E3FDC38D8 | +5vQeNxMQhe9K6HaTp3pqiCXuW0= |
| 56D2AFC560D495C758C798B4278E4FAF5CA76649 | +E/VUjI6wUEGwqAqUPTmCQkY2Gc= |
| BBA7CF6BBB5E6D5FCE518D02C50970B5A5F8312F | +HaEiOkL3mUe58uQ1eaCon3XO/o= |
| 7F6F91F7BFBC7E0E92B9E1FF8D16FC0CE117A4C8 | +I2fEK0VBGIuaFIRaVnf7CIYx+U= |

As shown, after replacing the old G/L account identifiers with new G/L account identifiers in the keystrings, the corresponding hashed keys are also updated. The variant ID that is unique to the corresponding G/L account remains unchanged. This can be further illustrated in the following table, which shows that despite the change of G/L account identifiers, the reference framework still can refer to the correct G/L accounts because the new G/L account identifiers are associated with the correct G/L accounts (which are uniquely identified by the variant IDs.).

ning system. The reference framework can be configured to modify the plurality of tables upon receiving an upgrade directive from a service provider. The upgrade directive can specify new features or functionalities to be implemented in the deployed cloud-based enterprise resource planning system.

EXAMPLE 9—EXAMPLE ADVANTAGES

A number of advantages can be achieved via the technology described herein. For example, the described technolo-

| G/L Account | Variant ID | New Acct. ID | Old Acct. ID |
|---|---|---|---|
| Cost of Incorporation & Capital Increases | +5vQeNxMQhe9K6HaTp3pqiCXuW0= | 000600000 | 000200000 |
| Cost of issuing loans | +E/VUjI6wUEGwqAqUPTmCQkY2Gc= | 000109999 | 000201000 |
| Other expenses | +HaEiOkL3mUe58uQ1eaCon3XO/o= | 000505000 | 000202000 |
| Restructuring cost | +I2fEK0VBGIuaFIRaVnf7CIYx+U= | 000105000 | 000204000 |

EXAMPLE 8—EXAMPLE EMBODIMENT

In an example embodiment, changing the respective plurality of old account identifiers to the corresponding plurality of new account identifiers in the plurality of backend tables and the reference framework can be scheduled to occur in a period when there are no business transactions involving the plurality of general ledger accounts. This is because conversion of runtime data in the reference framework and generating the hashed keys can take some non-negligible time. Thus, such arrangement can ensure the integrity of the changes and avoid unintentional disruption of the transactions.

In an example embodiment, one or more computer-readable media can have encoded thereon computer-executable instructions, which, when executed, can cause one or more processors to: in a deployed cloud-based enterprise resource planning system including a plurality of general ledger accounts, receive a change request specifying a plurality of new account identifiers corresponding to the plurality of general ledger accounts, wherein the plurality of general ledger accounts are associated with respective plurality of old account identifiers; for a plurality of tables in the deployed enterprise resource planning system, change the respective plurality of old account identifiers to the corresponding plurality of new account identifiers; and for a reference framework interfacing with the plurality of tables, change the respective plurality of old account identifiers to the corresponding plurality of new account identifiers in the reference framework. The plurality of tables and the reference framework can be located in a cloud-based backend tenant of the deployed cloud-based enterprise resource plangies substantially improves the efficiency and flexibility of the cloud ERP system by allowing a client to reconfigure the cloud ERP system even after it goes live. Specifically, the described technologies allow a client to change the G/L account identifiers after the cloud ERP system is deployed, without the need to discard the historical transactional data that has been accumulated by the system or re-implement the cloud ERP solution afresh with the new G/L account identifiers.

EXAMPLE 10—EXAMPLE COMPUTING SYSTEMS

Figure 8:
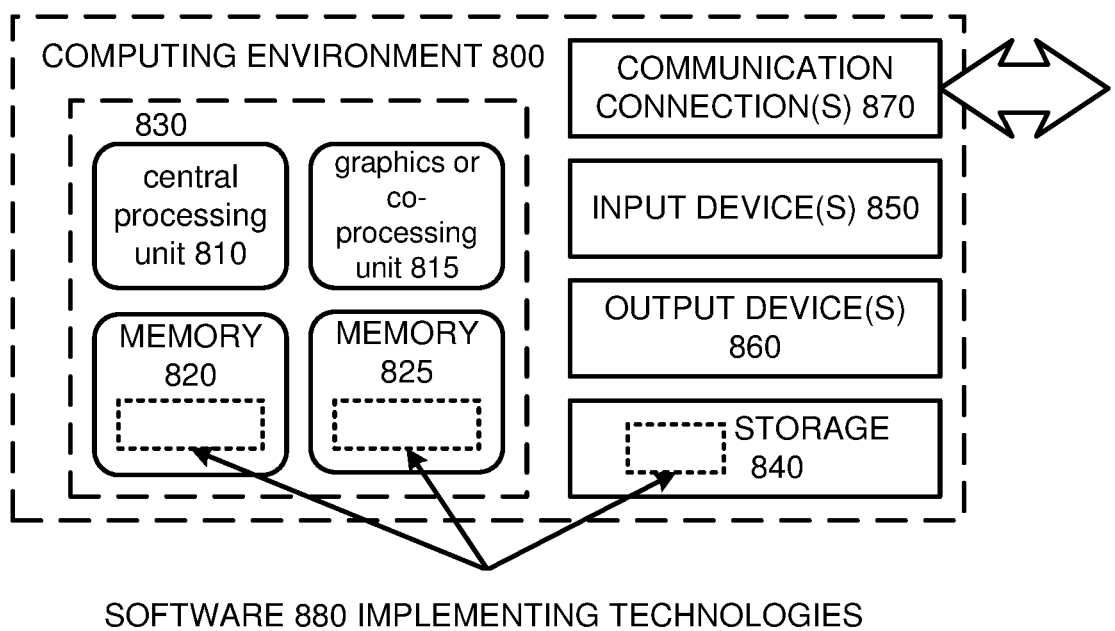
FIG. 8 is a block diagram of an example computing system in which the described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 can have additional features. For example, the computing system 800 includes storage 840, one or more input devices 850, one or more output devices 860, and one or more communication connections 870, including input devices, output devices, and communication connections for interacting with a user. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

EXAMPLE 11—COMPUTER-READABLE MEDIA

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

EXAMPLE 12—EXAMPLE CLOUD COMPUTING ENVIRONMENT

Figure 9:
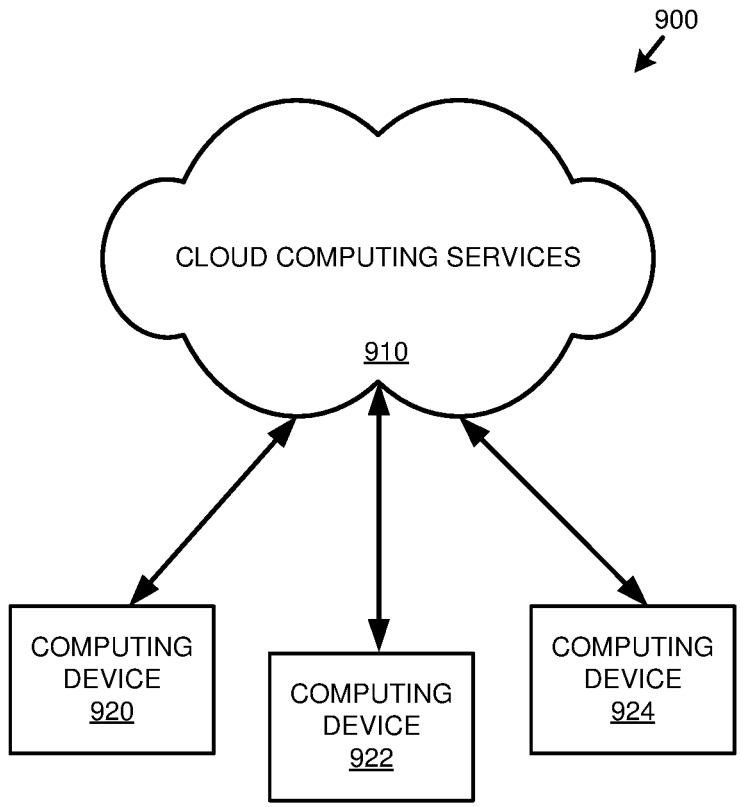
FIG. 9 is a block diagram of an example cloud computing environment that can be used in conjunction with the technologies described herein.

FIG. 9 depicts an example cloud computing environment 900 in which the described technologies can be implemented, including, e.g., the system 100 of FIG. 1 and other systems herein. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

EXAMPLE 13—EXAMPLE IMPLEMENTATIONS

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

EXAMPLE 14—EXAMPLE ALTERNATIVES

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
in a deployed cloud-based enterprise resource planning system comprising a general ledger account, receiving a change request specifying a new account identifier for the general ledger account, wherein the general ledger account is associated with an old account identifier, wherein the deployed cloud-based enterprise resource planning system comprises accumulated transactional data associated with the old account identifier;
 for a plurality of tables in the deployed cloud-based enterprise resource planning system, changing the old account identifier to the new account identifier;
for a reference framework interfacing with the plurality of tables, changing the old account identifier to the new account identifier in the reference framework, wherein the reference framework is a software module comprising runtime data, wherein the runtime data comprises a plurality of storage entities containing references to the general ledger account, wherein the references comprise the old account identifier or the new account identifier; and
 updating a hashed key after changing the old account identifier to the new account identifier in the reference framework,
 wherein the plurality of tables are located in a cloud-based backend tenant of the deployed cloud-based enterprise resource planning system, wherein the plurality of tables are modified via the reference framework upon receiving an upgrade directive from a service provider.

2. The method of claim 1, wherein changing the old account identifier to the new account identifier in the reference framework comprises:
identifying the plurality of storage entities containing references to the general ledger account;
 searching for a predefined text pattern associated with the general ledger account in the identified plurality of storage entities, wherein the predefined text pattern is followed by the old account identifier; and for found predefined text pattern associated with the general ledger account, replacing the old account identifier with the new account identifier.

3. The method of claim 2, wherein updating the hashed key comprises applying a hash function to a keystring comprising the new account identifier which replaces the old account identifier.

4. The method of claim 1, wherein the upgrade directive specifies new features or functionalities to be implemented in the deployed cloud-based enterprise resource planning system.

5. The method of claim 1, wherein the reference framework is located in the cloud-based backend tenant of the deployed cloud-based enterprise resource planning system.

6. The method of claim 1, wherein the reference framework is located external to the cloud-based backend tenant of the deployed cloud-based enterprise resource planning system.

7. The method of claim 1, wherein changing the old account identifier to the new account identifier in the plurality of tables and the reference framework is scheduled to occur in a period when there are no business transactions involving the general ledger account.

8. The method of claim 1, wherein the general ledger account is one of a plurality of general ledger accounts in a chart of accounts, wherein a plurality of old account identifiers are respectively associated with the plurality of general ledger accounts, the change request specifying a plurality of new account identifiers corresponding to the plurality of general ledger accounts, and the method further comprises:
 for the plurality of tables in the deployed cloud-based enterprise resource planning system, changing the plurality of old account identifiers to the corresponding plurality of new account identifiers; and for the reference framework interfacing with the plurality of tables, changing the plurality of old account identifiers to the corresponding plurality of new account identifiers in the reference framework.

9. The method of claim 8, wherein changing the plurality of old account identifiers to the corresponding plurality of new account identifiers in the plurality of tables comprises:
 grouping the plurality of old account identifiers into a sequence of brackets such that each bracket comprises a pair of old account identifiers, and the plurality of old account identifiers in the sequence of brackets are arranged in an increasing order;
replacing the plurality of old account identifiers in the sequence of brackets with the corresponding plurality of new account identifiers; and
rearranging the sequence of brackets to generate a shuffled sequence of brackets such that the plurality of new account identifiers in the shuffled sequence of brackets are arranged in an increasing order.

10. A system comprising:
one or more processors; and memory coupled to the one or more processors comprising instructions causing the one or more processors to perform the following when executed: in a deployed cloud-based enterprise resource planning system comprising a general ledger account,
receiving a change request specifying a new account identifier for the general ledger account, wherein the general ledger account is associated with an old account identifier, wherein the deployed cloud-based enterprise resource planning system comprises accumulated transactional data associated with the old account identifier;
for a plurality of tables in the deployed cloud-based enterprise resource planning system, changing the old account identifier to the new account identifier; and for a reference framework interfacing with the plurality of tables, changing the old account identifier to the new account identifier in the reference framework, wherein the reference framework is a software module comprising runtime data,
wherein the runtime data comprises a plurality of storage entities containing references to the general ledger account, wherein the references comprise the old account identifier or the new account identifier; and
updating a hashed key after changing the old account identifier to the new account identifier in the reference framework,
wherein the plurality of tables are located in a cloud-based backend tenant of the deployed cloud-based enterprise resource planning system, wherein the plurality of tables are modified via the reference framework upon receiving an upgrade directive from a service provider.

11. The system of claim 10, wherein the upgrade directive specifies new features or functionalities to be implemented in the deployed cloud-based enterprise resource planning system.

12. The system of claim 10, wherein the reference framework is located in the cloud-based backend tenant of the deployed cloud-based enterprise resource planning system.

13. The system of claim 10, wherein the reference framework is located external to the cloud-based backend tenant of the deployed cloud-based enterprise resource planning system.

14. The system of claim 10, wherein changing the old account identifier to the new account identifier in the plurality of tables and the reference framework is scheduled to occur in a period when there are no business transactions involving the general ledger account.

15. The system of claim 10, wherein the general ledger account is one of a plurality of general ledger accounts in a chart of accounts, wherein:
- a plurality of old account identifiers are respectively associated with the plurality of general ledger accounts;
- the change request specifies a plurality of new account identifiers corresponding to the plurality of general ledger accounts; and
- the instructions further cause the one or more processors to perform the following when executed:
- for the plurality of tables in the deployed cloud-based enterprise resource planning system, changing the plurality of old account identifiers to the corresponding plurality of new account identifiers; and
- for the reference framework interfacing with the plurality of tables, changing the plurality of old account identifiers to the corresponding plurality of new account identifiers in the reference framework.

16. The system of claim 15, wherein changing the plurality of old account identifiers to the corresponding plurality of new account identifiers in the plurality of tables comprises:
- grouping the plurality of old account identifiers into a sequence of brackets such that each bracket comprises a pair of old account identifiers, and the plurality of old account identifiers in the sequence of brackets are arranged in an increasing order;
- replacing the plurality of old account identifiers in the sequence of brackets with the corresponding plurality of new account identifiers; and
- rearranging the sequence of brackets to generate a shuffled sequence of brackets such that the plurality of new account identifiers in the shuffled sequence of brackets are arranged in an increasing order.

17. The system of claim 10, wherein changing the old account identifier to the new account identifier in the reference framework comprises: identifying the plurality of storage entities containing references to the general ledger account;
- searching for a predefined text pattern associated with the general ledger account in the identified plurality of storage entities, wherein the predefined text pattern is followed by the old account identifier; and for found predefined text pattern associated with the general ledger account, replacing the old account identifier with the new account identifier.

18. The system of claim 17, wherein updating the hashed key comprises applying a hash function to a keystring comprising the new account identifier which replaces the old account identifier.

19. One or more non-transitory computer-readable media having encoded thereon computer-executable instructions causing one or more processors to perform a method comprising:
- in a deployed cloud-based enterprise resource planning system comprising a general ledger account, receiving a change request specifying a new account identifier corresponding to the general ledger account, wherein the general ledger account is associated with an old account identifier, wherein the deployed cloud-based enterprise resource planning system comprises accumulated transactional data associated with the old account identifier;
- for a plurality of tables in the deployed cloud-based enterprise resource planning system, changing the old account identifier to the new account identifier;
- for a reference framework interfacing with the plurality of tables, changing the old account identifier to the new account identifier in the reference framework, wherein the reference framework is a software module comprising runtime data, wherein the runtime data comprises a plurality of storage entities containing references to the general ledger account, wherein the references comprise the old account identifier or the new account identifier; and
- updating a hashed key after changing the old account identifier to the new account identifier in the reference framework; wherein changing the old account identifier to the new account identifier in the reference framework comprises:
- identifying the plurality of storage entities containing references to the general ledger account;
- searching for a predefined text pattern associated with the general ledger account in the identified plurality of storage entities, wherein the predefined text pattern is followed by the old account identifier; and
- for found predefined text pattern associated with the general ledger account, replacing the old account identifier with the new account identifier,
- wherein updating the hashed key comprises applying a hash function to a keystring comprising the new account identifier which replaces the old account identifier,
- wherein the plurality of tables are located in a cloud-based backend tenant of the deployed cloud-based enterprise resource planning system, wherein the plurality of tables are modified via the reference framework upon receiving an upgrade directive from a service provider.

* * * * *